United States Patent
Ling et al.

(10) Patent No.: US 9,169,568 B2
(45) Date of Patent: Oct. 27, 2015

(54) METHOD FOR FABRICATING GRAPHENE

(71) Applicant: NATIONAL TSING HUA UNIVERSITY, Hsinchu (TW)

(72) Inventors: Yong-Chien Ling, Hsinchu (TW); Chih-Ping Wang, Taipei (TW); Jen-Yu Liu, Hsinchu (TW)

(73) Assignee: NATIONAL TSING HUA UNIVERSITY, Hsin-Chu (TW)

( * ) Notice: Subject to any disclaimer, the term of this patent is extended or adjusted under 35 U.S.C. 154(b) by 280 days.

(21) Appl. No.: 13/886,501

(22) Filed: May 3, 2013

(65) Prior Publication Data

US 2013/0299359 A1 Nov. 14, 2013

(30) Foreign Application Priority Data

May 10, 2012 (TW) .............................. 101116707 A

(51) Int. Cl.
*C25B 1/00* (2006.01)
*C01B 31/02* (2006.01)
*B82Y 40/00* (2011.01)
*C01B 31/04* (2006.01)
*B82Y 30/00* (2011.01)

(52) U.S. Cl.
CPC . *C25B 1/00* (2013.01); *B82Y 30/00* (2013.01); *B82Y 40/00* (2013.01); *C01B 31/0446* (2013.01); *C01B 31/0484* (2013.01)

(58) Field of Classification Search
None
See application file for complete search history.

(56) References Cited

U.S. PATENT DOCUMENTS 8,858,776 B2* 10/2014 Li et al. .................... 205/341
2011/0319554 A1* 12/2011 Frazier et al. ............. 524/577

OTHER PUBLICATIONS

Yin et al, One-step "green" preparation of graphene nanosheets and carbon nanospheres mixture by electrolyzing graphite rob and its application for glucose biosensing, Biosensors and Bioelectronics, vol. 30, No. 1, Dec. 2011, pp. 112-117.*
Zeng et al, In Situ One-Step Electrochemical Preparation of Graphene Oxide Nanosheet-Modified Electrodes for Biosensors, ChemSusChem, vol. 4, No. 11, Sep. 2011, pp. 1587-1591.*
Lin et al, Facile preparation of nitrogen-doped graphene as a metal-free catalyst for oxygen reduction reaction, Physical Chemistry Chemical Physics, vol. 14, No. 10, Jan. 2012, pp. 3381-3387.*
Qu et al, Nitrogen-Doped Graphene as Efficient Metal-Free Electrocatalyst for Oxygen Reduction in Fuel Cells, American Chemical Society Nano, vol. 4, No. 3, Feb. 2010, pp. 1321-1326.*
Li et al, Simultaneous Nitrogen Doping and Reduction of Graphene Oxide, Journal of the American Chemical Society, vol. 131, No. 43, Oct. 2009, pp. 15939-15944.*
Liu et al, One-Step Ionic-Liquid-Assisted Electrochemical Synthesis of Ionic-Liquid-Functionalized Graphene Sheets Directly from Graphite, Advanced Functional Materials, vol. 18, No. 10, May 2008, pp. 1518-1525.*

(Continued)

*Primary Examiner* — Harry D Wilkins, III
(74) *Attorney, Agent, or Firm* — WPAT, P.C.; Anthony King; Kay Yang

(57) ABSTRACT

The present invention discloses a method for fabricating graphene, and comprises at least the following steps. First, a first electrode and a second electrode are inserted into an electrolyte without contacting. The first electrode is graphite, and the electrolyte comprises at least an ionic liquid. A potential difference will be produced between the first electrode and the second electrode to let the ionic liquid enter into each layer of the first electrode to form a plurality of graphene.

19 Claims, 4 Drawing Sheets

(56) References Cited

OTHER PUBLICATIONS

Lu et al, One-Pot Synthesis of Fluorescent Carbon Nanorubbons, Nanoparticles, and Graphene by the Exfoliation of Graphite in Ionic Liquids, American Chemical Society Nano, vol. 3, No. 8, Aug. 2009, pp. 2367-2375.*

Wang et al, Electrochemical Delaminaton of CVD-Grown Graphene Film: Toward the Recyclable Use of Copper Catalyst, American Chemical Society Nano, vol. 5, No. 12, Oct. 2011, pp. 9927-9933.*

* cited by examiner

METHOD FOR FABRICATING GRAPHENE

CROSS-REFERENCE TO RELATED APPLICATIONS

This Non-provisional application claims priority under 35 U.S.C. §119(a) on Patent Application No(s). [101116707] filed in Taiwan, Republic of China, [May 10, 2012], the entire contents of which are hereby incorporated by reference.

FIELD OF THE INVENTION

This invention relates to a method for fabricating graphene, especially relates to a method for fabricating nitrogen-doped graphene by utilizing principle of electrochemistry to achieve several advantages such as low cost and environmental protection.

BACKGROUND OF THE INVENTION

Graphene has attracted a great deal of scientific interest in later years owing to its unique properties, such as large thermal conductivity and excellent electronic transport properties. Theoretical and experimental studies identified its outstanding mechanics, electricity, chemicals, thermal stability, specific surface areas, mobility of charge carriers, and thermal conductivity. Many prospective applications of graphene are being actively investigated at present. However, the actual implementation of graphene in technological uses will depend critically on the development of appropriate methodologies for its mass production.

In this regard, one of the most promising approaches is based on the exfoliation of graphite. However, the above method cannot be mass produced due to its low yield. Furthermore, some methods were provided to put graphite powder or graphite fiber into a solution mixed with the strong oxidant such as sulfuric acid and nitric acid, and then each layer of the graphite will be oxidized to graphite oxide. The graphite oxide is washed to adjust the pH until 7 by water and dried in an oven at 1100~1250° C. to let the graphite oxide quickly expand and exfoliate to form the two-dimensional graphene oxide. In other case, the graphite powder can be oxidized by sulfuric acid and nitric acid to form graphite oxide. And then, the graphite oxide is washed by DI water to obtain expanded graphite oxide. After processing the expanded graphite oxide at different temperatures of 600° C. and 1500° C., the expanded graphite oxide will be dispersed in the water, exfoliated by ultrasonic oscillation and ground to form the graphene oxide at nanometer degree. However, the above method, which is performed by mixing the strong oxidant and heating, is too complicated to be mass produced.

Hummer's method is provided in addition to the abovementioned methods. It is to fabricate the oxidized graphite and spin-coat the oxide on a silicon oxide substrate. And then, the substrate will be processed a reduction reaction for 20 hours to obtain the graphene. However, this method only can fabricate the graphene with the functional group on its surface. On the other hand, the other method is also provided to sputter and deposit nickel on the $SiO_2$ substrate to form a catalyst layer with a thickness of 100 nm. And then, carbon source such as ethylene will be loaded inside and split to form carbon to deposit on the surface of the catalyst layer. Finally, the substrate will be put into 0.1M HCl to corrode nickel layer to obtain the graphene. Although this method can form fewer layers of graphene on the substrate with the large area, the high temperature such as 950° C. is needed to split the carbon source.

To sum up, although the graphene can be fabricated by exfoliating, grinding, cutting open nanotubes, oxidation-reduction reaction, hetero-epitaxy or mixing the acids and heating, the abovementioned methods always have some limitations, such as low yield, complicated procedure or toxic agent, so that the above methods cannot be utilized to mass produce graphene.

SUMMARY OF THE INVENTION

According to the abovementioned disadvantages of the prior art, the present invention provides a method for fabricating graphene with several advantages, such as low cost, fast and green, according to ionic liquid and electrochemistry principle. And further, the invented method can further fabricate nitrogen-doped graphene with high quality and is to benefit for further investigation in other applications, such as biosensor, electrocatalysis and bioanalysis.

The present invention provides a method for fabricating graphene, and the method at least comprises the following steps. First, a first electrode and a second electrode are inserted into an electrolyte without contacting. The first electrode is graphite, and the electrolyte comprises at least an ionic liquid. A potential difference will be produced between the first electrode and the second electrode to let the ionic liquid enter into each layer of the first electrode to form a plurality of graphene.

Preferably, the method further comprises the following step of nitriding the graphene.

Preferably, the percentage of nitrogen atoms out of total atoms in the graphene is 0.01~99%.

Preferably, the method further comprises the following step before the step of nitriding the graphene. First, we extract the graphene, the ionic liquid inserted inside graphene and the ionic liquid on the surface of graphene from the electrolyte.

Preferably, before graphene nitrogen doping step, it is needed to take the step of extracting the graphene and the ionic liquid from the electrolyte. The extraction is preferably performed by centrifugation, filter, column chromatography, temperature gradient, density gradient, supercritical fluid extraction, quiescence or adding an incompatible solvent.

Preferably, the step of nitriding the graphene is performed under different conditions of pressure, temperature, ambient gas or solvent, and the combination thereof.

Preferably, the condition of pressure has a value between 1~100 atm, the condition of temperature has a value between 300~400° C., the ambient gas comprises oxygen, nitrogen, hydrogen, one of noble gas or their mixture, and the solvent comprises water, menthol, ethanol or any other solvent which can dissolve the ionic liquid but cannot dissolve the graphene.

Preferably, the ionic liquid comprises a cation and an anion, and the cation can be selected from a group consisting of ammonium, imidazolium, oxazolium, piperidinium, pyrazinium, pyrazolium, pyridazinium, pyrimidinium, pyrrolidinium, pyrrolinium, thiazolium, triazolium and guanidinium ionic liquid, and the anion can be selected from a group consisting of halogen, sulfate, phosphate, amide, imide, borate, sulfonate, antimonite, decanoate and cobalt tetracarbonyl anion.

Preferably, the electrolyte further comprises an auxiliary liquid and the auxiliary liquid comprises a first solvent and a second solvent. The first solvent can be selected from a group consisting of hydrobromic acid, hydrobromic acid, ammonium hydroxide, aniline, pyrrole, thiofuran, ethyne, dimethyl sulfoxide, ethanol, phenylene vinylene and the combination thereof, and the second solvent can be selected from a group consisting of ester, ether, ketone and the combination thereof.

Preferably, the second solvent is carbonate, and selected from a group consisting of dimethyl carbonate, diethyl carbonate, dipropyl carbonate, methyl propyl carbonate, ethyl propyl carbonate, ethyl methyl carbonate, ethylene carbonate, propylene carbonate, butylenes carbonate and the combination thereof.

Preferably, the second solvent can be selected from a group consisting of methyl acetate, ethyl acetate, n-propyl acetate, dimethyl acetate, methyl propanoate, ethyl propanoate, γ-butyrolactone, decalactone, pentanolactone, mevalonic acid lactone, caprolactone and the combination thereof.

Preferably, the second solvent can be selected from a group consisting of dibutyl ether, tetraethylene glycol dimethyl ether, diethylene glycol dimethyl ether, dimethoxyethane, 2-methyl tetra-nitro dibenzofuran, tetrahydrofuran and the combination thereof.

Preferably, the second solvent can be selected from a group consisting of cyclohexanone, poly(methyl vinyl ketone) and the combination thereof.

Preferably, the second electrode is a graphite electrode, a platinum electrode or a stainless steel electrode.

Preferably, the step of producing a potential difference between the first electrode and the second electrode is performed by applying a constant current between the first electrode and the second electrode, and the constant current is applied for 0.5~24 hours with a value between 10 mA/g~20 A/g.

Preferably, the step of producing a potential difference between the first electrode and the second electrode is performed by applying a constant voltage between the first electrode and the second electrode, and the constant voltage is applied for 0.5~24 hours with a value between 0.5 V~20 V.

Preferably, the step of producing a potential difference between the first electrode and the second electrode is performed by applying a potential scanning between the first electrode and the second electrode, and the conditions of the potential scanning is applied for 0.5~24 hours with a scanning range between −0.2 V~20 V, or applied with a scanning frequency of 10~10000 times.

Preferably, the concentration of the ionic liquid has a value between 0.0001%~100%.

The method according to claim 1, wherein the first electrode and the second electrode are placed with a separation of 1 nm~20 cm.

Preferably, the first electrode and the second electrode are placed with an included angle of 0~180 degree.

The features and advantages of the present invention will be understood and illustrated in the following specification and FIGS. 1~2C.

DETAILED DESCRIPTION OF THE INVENTION

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

According to the abovementioned disadvantages of the prior art, the present invention provides a method for fabricating graphene. The method can not only fabricate dispersed graphene but also nitrogen-doped graphene. Generally speaking, carbon material with nitrogen-doped will enhance the physical and chemical properties of the material, therefore, the nitrogen-doped graphene fabricated by the present invention is expected to have several advantages such as high electric conductivity, field emission property, catalysis and storing.

Figure 1:
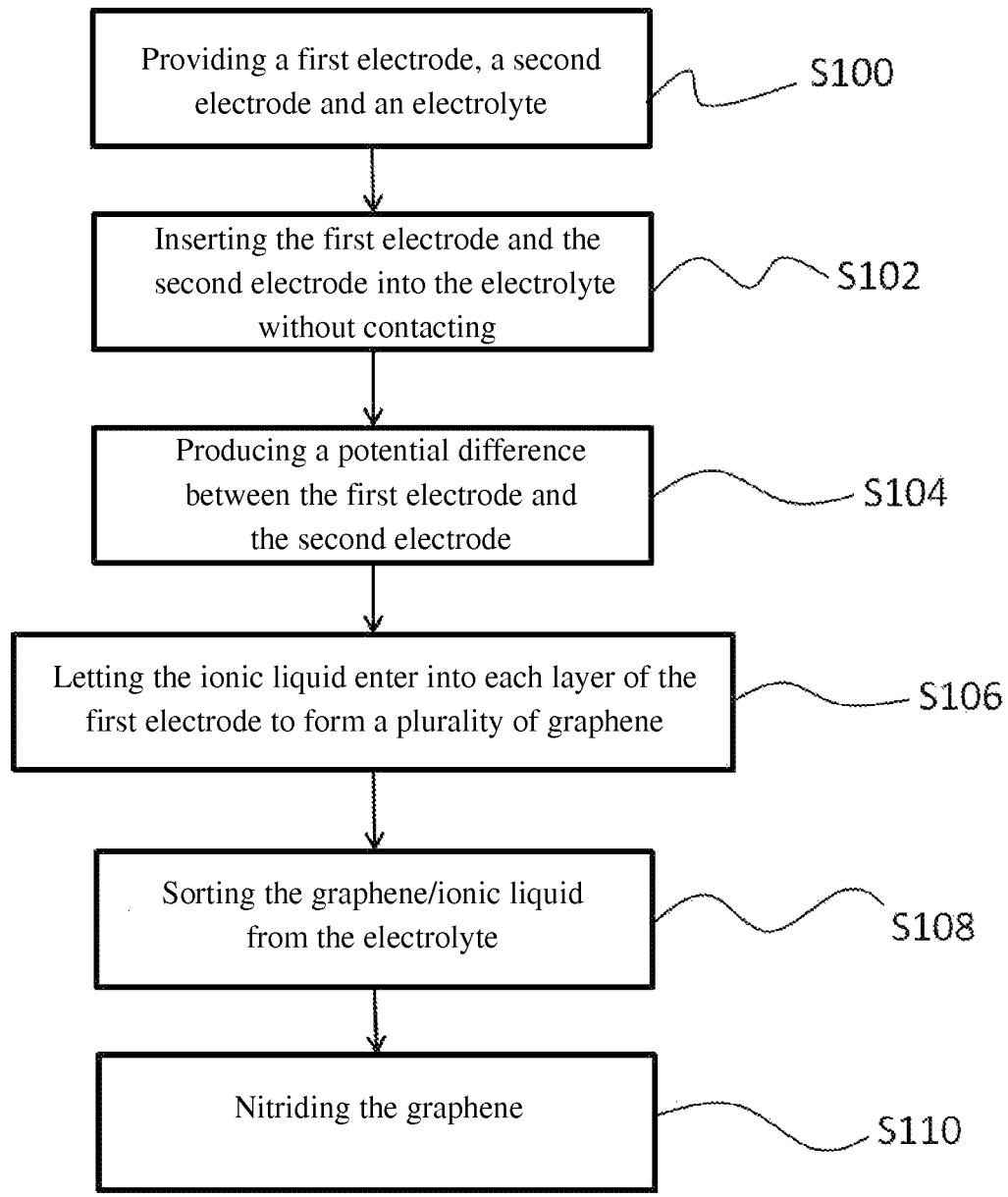
FIG. 1 is flow diagram showing a method according to a preferred embodiment of the present invention for fabricating graphene.
Figure 2A:
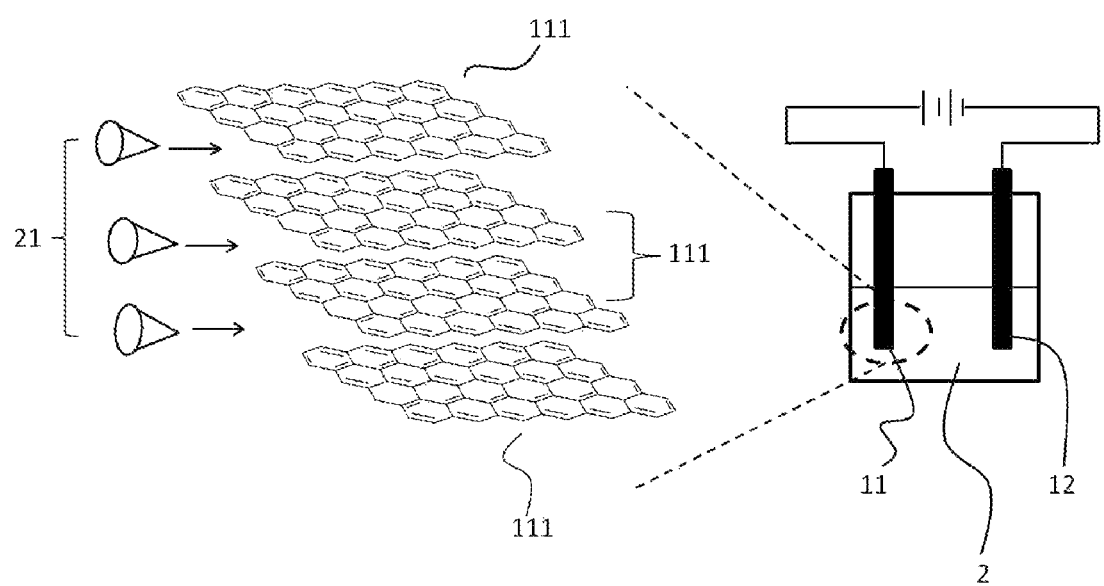
FIG. 2A to FIG. 2C are diagrams showing the fabricating setup of graphene according to the preferred embodiment of the present invention.

Please refer to FIG. 1 and FIG. 2A. FIG. 1 is flow diagram showing a method according to a preferred embodiment of the present invention for fabricating graphene, and FIG. 2A is diagram showing the fabricating setup of graphene according to the preferred embodiment of the present invention. First, a first electrode 11, a second electrode 12 and an electrolyte 2 are prepared as described in step S100. Preferably, the first electrode 11 is an anode and can be a graphite multilayer material. Preferably, the electrolyte 2 at least comprises an ionic liquid, and the concentration of the ionic liquid has a value between 0.0001%~100%.

Preferably, the abovementioned ionic liquid comprises a cation and an anion, and the cation can be selected from a group consisting of ammonium, imidazolium, oxazolium, piperidinium, pyrazinium, pyrazolium, pyridazinium, pyrimidinium, pyrrolidinium, pyrrolinium, thiazolium, triazolium and guanidinium ionic liquid, and the anion can be selected from a group consisting of halogen, sulfate, phosphate, amide, imide, borate, sulfonate, antimonite, decanoate and cobalt tetracarbonyl anion.

Furthermore, the electrolyte 2 further comprises an auxiliary liquid and the auxiliary liquid comprises a first solvent and a second solvent, wherein the first solvent can be selected from a group consisting of hydrobromic acid, ammonium hydroxide, aniline, pyrrole, thiofuran, ethyne, dimethyl sulfoxide, ethanol, phenylene vinylene and the combination thereof, and the second solvent can be selected from a group consisting of ester, ether, ketone and the combination thereof.

Preferably, if the second solvent is carbonate, and the carbonate can be selected from a group consisting of dimethyl carbonate, diethyl carbonate, dipropyl carbonate, methyl propyl carbonate, ethyl propyl carbonate, ethyl methyl carbonate, ethylene carbonate, propylene carbonate, butylenes carbonate and the combination thereof. And further, the second solvent can be selected from a group consisting of methyl acetate, ethyl acetate, n-propyl acetate, dimethyl acetate, methyl propanoate, ethyl propanoate, γ-butyrolactone, decalactone, pentanolactone, mevalonic acid lactone, caprolactone and the combination thereof.

If the second solvent is ether, and it can be selected from a group consisting of dibutyl ether, tetraethylene glycol dimethyl ether, diethylene glycol dimethyl ether, dimethoxyethane, 2-methyl tetra-nitro dibenzofuran, tetrahydrofuran and the combination thereof. Finally, the second solvent can be selected from a group consisting of cyclohexanone, poly(methyl vinyl ketone) and the combination thereof when the second solvent is ketone.

Step S102 is then performed by inserting the first electrode 11 and the second electrode 12 into the electrolyte 2 without contacting. That is, the first electrode 11 and the second electrode 12 can be placed with a separation of 1 nm~20 cm or an included angle of 0~180 degrees on the premise that they won't contact with each other. Preferably, the first electrode 11 and the second electrode 12 are placed with the separation of 1 cm; however, the present invention is not limited thereto.

Then, a potential difference is produced between the first electrode 11 and the second electrode 12 in step S104. As shown in FIG. 2A, the ionic liquid 21, which is illustrated as a cone (the right portion represents the head of the anion, the left portion represents the tail of the cation), will move to the first electrode 11 by means of the potential difference and enter into the first electrode 11. The first electrode 11 is the graphite multilayer material as abovementioned, therefore, the ionic liquid 21 will approach the first electrode 11 by the potential difference to insert into the space between each layer of the first electrode 11 in step S106.

Figure 2B:
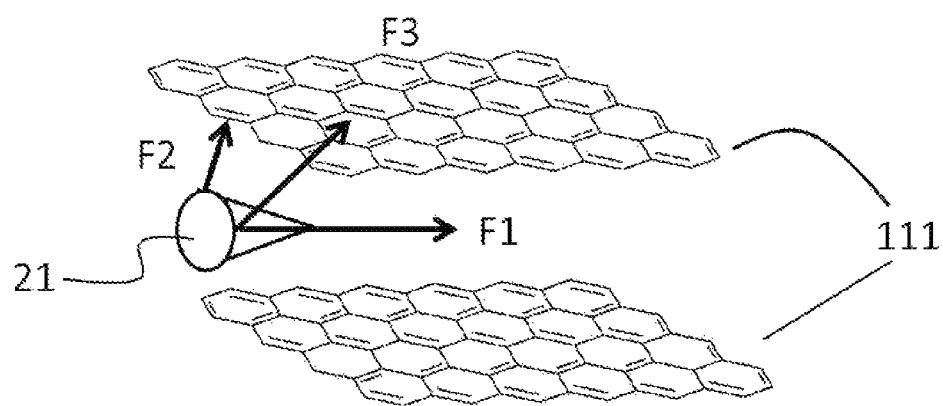

Please refer to FIG. 2B, the cation of the ionic liquid 21 has a similar surface tension with the graphite. That is, the ionic liquid 21 has an electric force F1 to let it inset into each layer of the graphite, and further a pi-pi interaction F2 is existed between the cation of the ionic liquid 21 and the graphite. The ionic liquid 21 is inserted into each layer of the graphite by the sum force F3 of the electric force F1 and the pi-pi interaction F2, and the graphite is then separated and exfoliated to form a plurality of graphene 111.

Figure 2C:
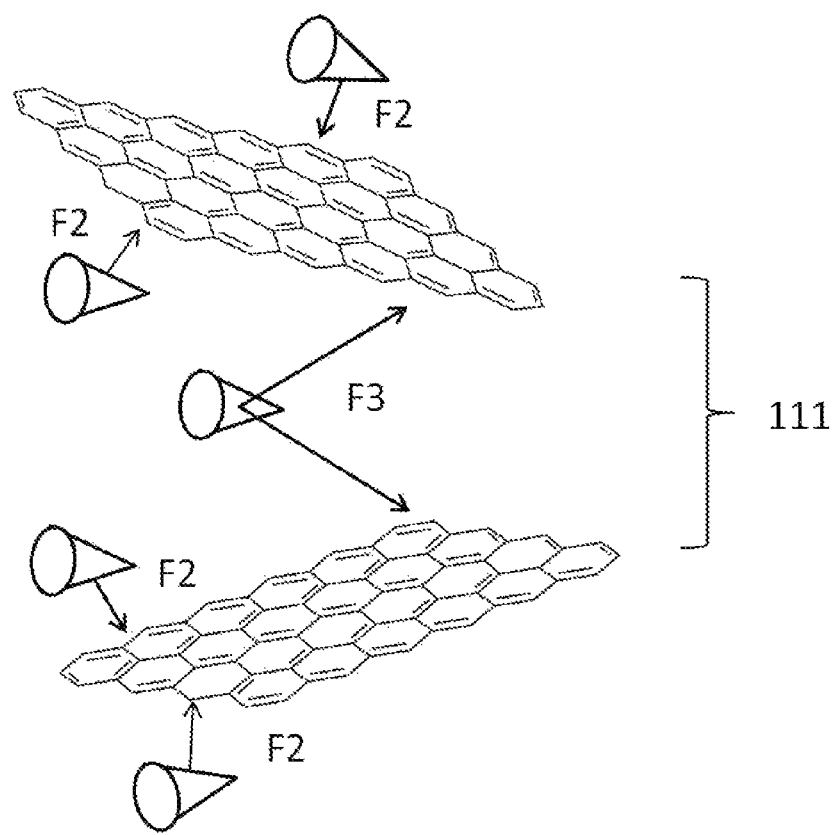

Please refer to FIG. 2C, when there are more ionic liquid inserted into the first electrode, the first electrode will be exfoliated more due to the sum force F3 as abovementioned. Finally, the dispersed graphene was stabilized by the van der Waals' forces.

Preferably, the step of producing a potential difference between the first electrode and the second electrode is performed by applying a constant current between the first electrode and the second electrode, and the constant current is applied for 0.5~24 hours with a value between 10 mA/g~20 A/g. Preferably, the step of producing a potential difference between the first electrode and the second electrode is performed by applying a constant voltage between the first electrode and the second electrode, and the constant voltage is applied for 0.5~24 hours with a value between 0.5V~20V. Preferably, the step of producing a potential difference between the first electrode and the second electrode is performed by applying a potential scanning between the first electrode and the second electrode, and the conditions of the potential scanning is applied for 0.5~24 hours with a scanning range between $-0.2$ V~20 V, or applied with a scanning frequency of 10~10000 times. However, the present invention is not limited to any of the above embodiments.

In step S108, the graphene and the ionic liquid are sorted from the electrolyte. Preferably, the step S108 is performed by centrifugation, filter, column chromatography, temperature gradient, density gradient, supercritical fluid extraction, quiescence or adding an incompatible solvent. Preferably, the step S108 can be performed by adding water, however, the present invention is not limited thereto. Finally, the sorted graphene, which is still covered by the ionic liquid, are further nitride to obtain nitrogen-doped graphene in step S110. Preferably, the step S110 is to dry the graphene in an oven at $N_2$ atmosphere for 4 hours at 300~400° C. And further, the percentage of nitrogen atoms out of total atoms in the graphene is 0.01~0.99%.

Although the graphene is sorted from the electrolyte in the step S108 and then the step S110 is performed, the step S108 can be ignored. That is, the graphene does not need to be sorted from the electrolyte and can be nitride directly by at least one of different conditions of pressure, temperature, ambient gas or solvent. For example, the condition of pressure has a value between 1~100 atm, the condition of temperature has a value between 300~400° C., the ambient gas comprises oxygen, nitrogen, hydrogen, one of noble gas or their mixture, and the solvent comprises water, menthol, ethanol or any other solvent which can dissolve the ionic liquid but cannot dissolve the graphene.

In an preferred embodiment, the abovementioned nitrogen-doped graphene has a length of 1 nm~100 mm, a width of 1 nm~100 nm, a thermal conductivity larger than 5000 w/m$^2$ k and a resistance of 28 Ω·μm. Preferably, the thickness of the graphene after stacking has a value from 0.3 nm to 1000 nm Preferably, the structure of the abovementioned nitrogen-doped graphene can be film, wire, layer or their combination. Preferably, the chemical composition of the nitrogen-doped graphene comprises nitrogen-doped graphene, graphene, nitrogen-doped oxygen-doped graphene, multilayer nitrogen-doped graphene stacked by the van der Waals' forces, multilayer graphene stacked by the van der Waals' forces, multilayer nitrogen-doped oxygen-doped graphene stacked by the van der Waals' forces or their combination.

To sum up, the method disclosed in the present invention for fabricating graphene by combining the principle of electrochemistryl and the ionic liquid has the following advantages:

(1) The benzene structures of the ionic liquid will connect with each other to form a electrical conductive network, thus, the ionic liquid can insert into each layer of the graphite by the principle of electrochemistry. And further, the ionic liquid and the graphite layer is much close so that the graphene is also well dispersed.

(2) There is no additional surfactant involved therein, therefore, the nitrogen-doped graphene/ionic liquid does not contain the surfactant.

(3) The method disclosed in the present invention does not need to use strong acid to oxidize the nitrogen-doped graphene, therefore, the nitrogen-doped graphene can preserve the completeness of its structure.

(4) The method disclosed in the present invention is to utilize the electrochemistry principle for using the ionic liquid to exfoliate the graphite and form the graphene. It is simple and low cost.

(5) The method disclosed in the present invention can further fabricate nitrogen-doped graphene, and the nitrogen-doped graphene comprises more advantages such as more useful thermal conductivity and resistance.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A method for fabricating graphene at least comprising the following steps:
    inserting a first electrode and a second electrode into an electrolyte without contacting, wherein the first electrode is graphite multilayer material and the electrolyte comprises at least an ionic liquid;
    producing a potential difference between the first electrode and the second electrode; and
    permitting the ionic liquid enter into each layer of the first electrode to form a plurality of graphene,
    wherein the electrolyte further comprises an auxiliary liquid and the auxiliary liquid comprises a first solvent and a second solvent, wherein the first solvent can be selected from a group consisting of hydrobromic acid, ammonium hydroxide, aniline, pyrrole, thiofuran, ethyne, dimethyl sulfoxide, ethanol, phenylene vinylene and the combination thereof, and the second solvent can be selected from a group consisting of ester, ether, ketone and the combination thereof.

2. The method according to claim 1 further comprising the following step:
   nitriding the graphene.

3. The method according to claim 2, wherein the percentage of nitrogen atoms out of total atoms in the graphene is 0.01~99%.

4. The method according to claim 2 further comprising the following step before the step of nitriding the graphene:
   sorting the graphene and the ionic liquid from the electrolyte, wherein the ionic liquid is inserted between the graphene and covered the surface of the graphene.

5. The method according to claim 4, wherein the step of sorting the graphene and the ionic liquid from the electrolyte is performed by centrifugation, filter, column chromatography, temperature gradient, density gradient, supercritical fluid extraction, quiescence or adding an incompatible solvent.

6. The method according to claim 2, wherein the step of nitriding the graphene is performed by different conditions of pressure, temperature, ambient gas or solvent.

7. The method according to claim 6, wherein the condition of pressure has a value between 1~100 atm, the condition of temperature has a value between 300~400° C., the ambient gas comprises oxygen, nitrogen, hydrogen, one of noble gas or their mixture, and the solvent comprises water, menthol, ethanol or any other solvent which can dissolve the ionic liquid but cannot dissolve the graphene.

8. The method according to claim 1, wherein the ionic liquid comprises a cation and an anion, and the cation can be selected from a group consisting of ammonium, imidazolium, oxazolium. piperidinium, pyrazinium, pyrazolium, pyridazinium, pyrimidinium, pyrrolidinium, pyrrolinium, thiazolium, triazolium and guanidinium ionic liquid, and the anion can be selected from a group consisting of halogen, sulfate, phosphate, amide, imide, borate, sulfonate, antimonite, decanoate and cobalt tetracarbonyl anion.

9. The method according to claim 1, wherein the second solvent is carbonate, and selected from a group consisting of dimethyl carbonate, diethyl carbonate, dipropyl carbonate, methyl propyl carbonate, ethyl propyl carbonate, ethyl methyl carbonate, ethylene carbonate, propylene carbonate, butylenes carbonate and the combination thereof.

10. The method according to claim 1, wherein the second solvent can be selected from a group consisting of methyl acetate, ethyl acetate, n-propyl acetate, dimethyl acetate, methyl propanoate, ethyl propanoate, γ-butyrolactone, decalactone, pentanolactone, mevalonic acid lactone, caprolactone and the combination thereof.

11. The method according to claim 1, wherein the second solvent can be selected from a group consisting of dibutyl ether, tetraethylene glycol dimethyl ether, diethylene glycol dimethyl ether, dimethoxyethane, 2-methyl tetra-nitro dibenzofuran, tetrahydrofuran and the combination thereof.

12. The method according to claim 1, wherein the second solvent can be selected from a group consisting of cyclohexanone, poly(methyl vinyl ketone) and the combination thereof.

13. The method according to claim 1, wherein the second electrode is a graphite electrode, a platinum electrode or a stainless steel electrode.

14. The method according to claim 1, wherein the step of producing a potential difference between the first electrode and the second electrode is performed by applying a constant current between the first electrode and the second electrode, and the constant current is applied for 0.5~24 hours with a value between 10 mA/g~20 A/g.

15. The method according to claim 1, wherein the step of producing a potential difference between the first electrode and the second electrode is performed by applying a constant voltage between the first electrode and the second electrode, and the constant voltage is applied for 0.5~24 hours with a value between 0.5 V~20 V.

16. The method according to claim 1, wherein the step of producing a potential difference between the first electrode and the second electrode is performed by applying a potential scanning between the first electrode and the second electrode, and the conditions of the potential scanning is applied for 0.5~24 hours with a scanning range between −0.2V~20V, or applied with a scanning frequency of 10~10000 times.

17. The method according to claim 1, wherein the concentration of the ionic liquid has a value between 0.0001%~100%.

18. The method according to claim 1, wherein the first electrode and the second electrode are placed with a separation of 1 nm~20 cm.

19. The method according to claim 1, wherein the first electrode and the second electrode are placed with an included angle of 0~180 degree.

* * * * *